Aug. 11, 1964   J. BASCI   3,144,016
STACKED VESSELS
Filed May 12, 1961   2 Sheets-Sheet 1
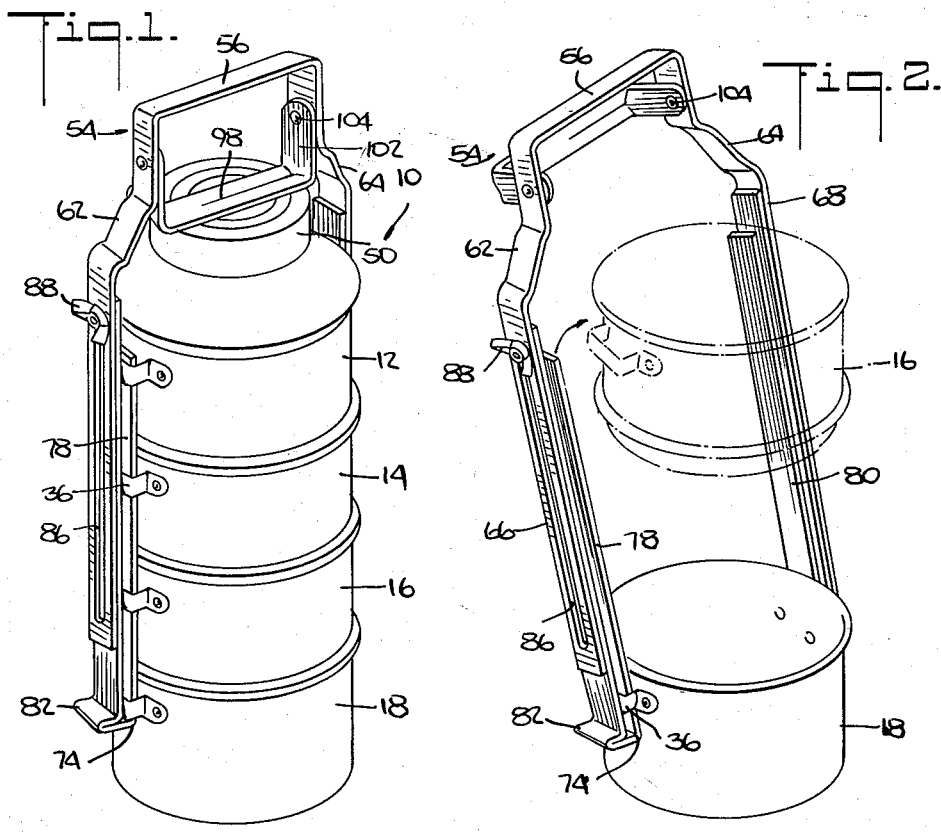
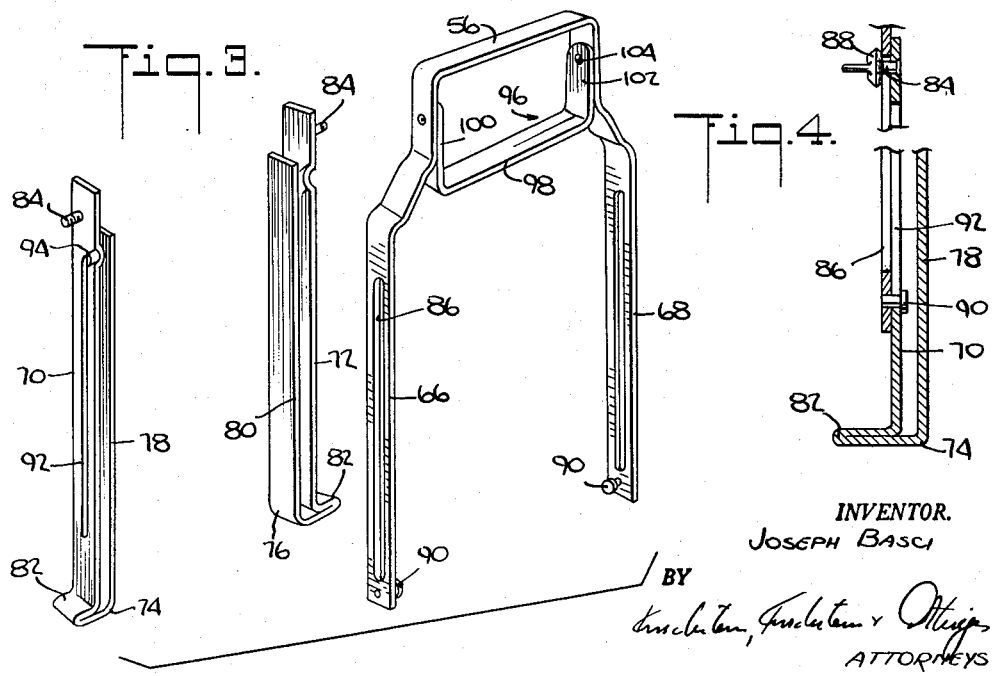
INVENTOR.
JOSEPH BASCI
BY
ATTORNEYS Aug. 11, 1964   J. BASCI   3,144,016
STACKED VESSELS
Filed May 12, 1961   2 Sheets-Sheet 2
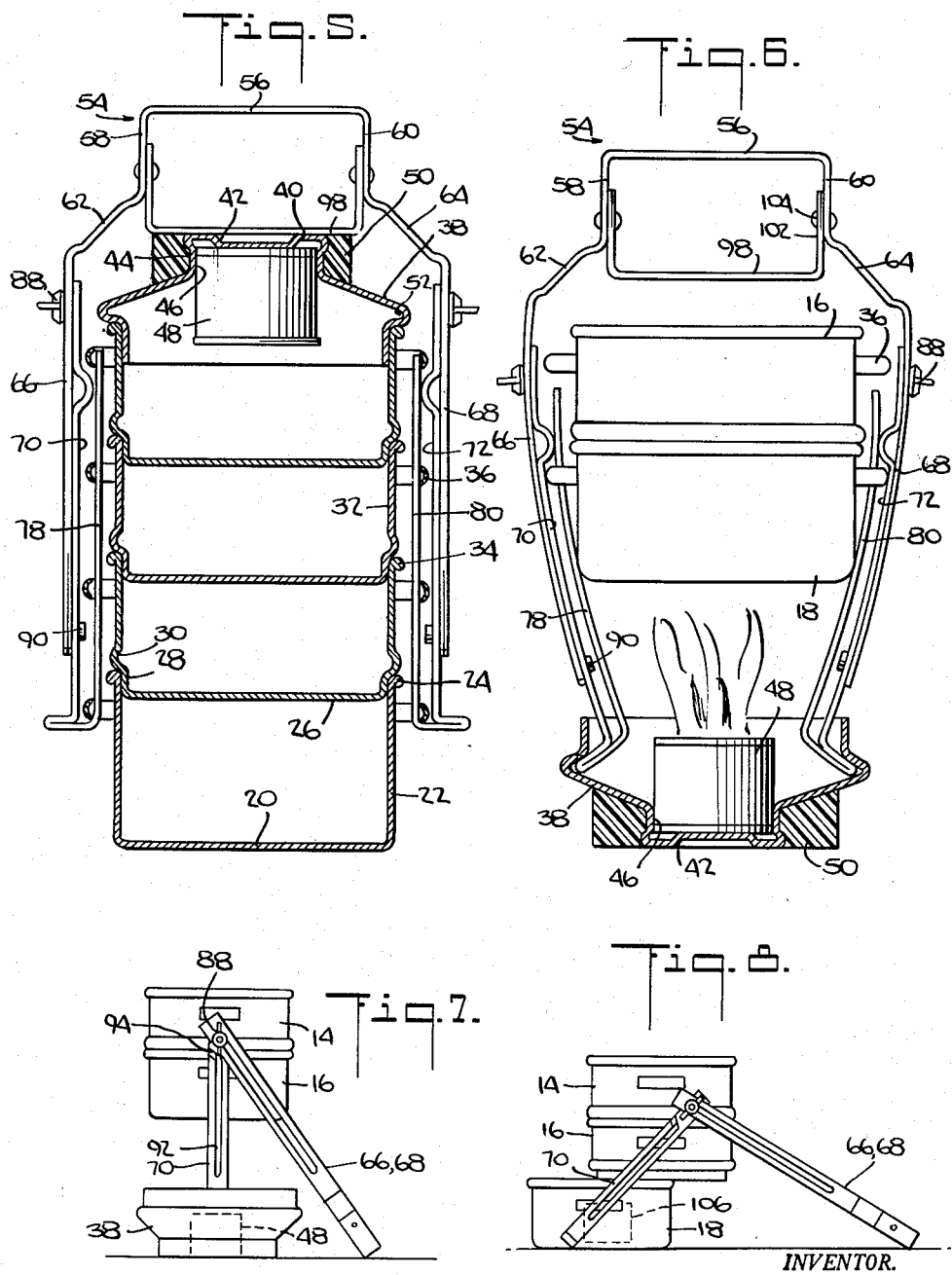
INVENTOR.
JOSEPH BASCI
BY
ATTORNEYS United States Patent Office 3,144,016
Patented Aug. 11, 1964

3,144,016
STACKED VESSELS
Joseph Basci, % Ali Electronics, 1312 39th St.,
Brooklyn, N.Y.
Filed May 12, 1961, Ser. No. 109,684
3 Claims. (Cl. 126—265)

This invention relates to stacked vessels.

It is an object of my invention to provide a stack of compression-coupled vessels which are adapted to be rearranged in a manner such that one or more of the vessels can readily be heated.

It is another object of my invention to provide a stack of compression-coupled vessels which are adapted to be rearranged for alternate use as a chafing dish.

It is another object of my invention to provide a stack of compression-coupled vessels which are adapted to be rearranged for use as a double boiler.

It is another object of my invention to provide a stack of compression-coupled vessels in which the compression-coupling and carrying handle can be varied in height so as to couple different numbers of vessels and vessels of varying heights.

It is another object of my invention to provide a stack of compression-coupled vessels which when rearranged for the purpose of heating or serving may be stabilized by an auxiliary leg which normally forms part of the compression-coupling handle.

Other objects of my invention in part will be obvious and in part will be pointed out hereinafter.

My invention accordingly consists in the features of construction, combinations of elements, and arrangement of parts which will be exemplified in the devices hereinafter described, and of which the scope of application will be indicated in the appended claims.

In the accompanying drawings, in which are shown various possible embodiments of my invention, FIG. 1 is a perspective view of a stack of compression-coupled vessels constructed in accordance with my invention;

FIG. 2 is a view similar to FIG. 1 but illustrating the compression-coupling handle partially disengaged from the stack;

FIG. 3 is an exploded perspective view of the parts of the compression-coupling handle;

FIG. 4 is an enlarged sectional view of a detail of the handle;

FIG. 5 is a vertical sectional view through a stack of compression-coupled vessels;

FIG. 6 is a vertical sectional view through two of the vessels coupled by the handle and rearranged to function as a chafing dish;

FIG. 7 is a side view of two vessels coupled to function as a chafing dish and with the handle rearranged to provide an auxiliary support; and FIG. 8 is a side view of some of the vessels coupled to function as a double boiler and with the handle rearranged to act as an auxiliary support.

Referring now in detail to the drawings, the reference numeral 10 denotes a stack of vessels (pots) constructed in accordance with and embodying my invention. Specifically, I provide a plurality of vessels 12, 14, 16 and 18, the number of vessels not being a feature of my invention. Normally, i.e. for ordinary usage, I provide four such vessels. It should be understood however that a greater or lesser number can be used. In no event will less than two vessels be employed and preferably never less than three will be present.

The specific construction of the vessels 12, 14, 16 and 18 will depend upon the particular use to which these vessels are to be put. The stack 10 shown in the accompanying drawings is designed to be used for catering purposes, it being understood that this is not to be construed as limitation upon my invention. In such case the vessels are of the simplest, i.e. minimal, construction embodying my invention. I wish it to be understood, however that such construction can be made far more complex without departing from the spirit of my invention and I will hereinafter, simply by way of example, mention some alternate structures.

Likewise the materials from which the vessels are made and the finish of the vessels can be varied at will within the scope of the invention. In the present instance the illustrated vessels are made from sheet aluminum, this having the advantage of being both light and inexpensive. Moreover it can be easily cleaned, sterilized and polished and is quite attractive for use in connection with a catering service. Still further, aluminum is one of the accepted materials for food handling. It raises no danger of food poisoning or food contamination.

The bottom vessel 18 may be of a construction different from that of the remaining vessels 12, 14 and 16 in that said bottom vessel 18 is capable of having a simpler construction; hence I will describe such construction first, it being understood that, if desired, the construction of the bottom vessel 18 may be identical with the construction of the upper vessels 12, 14 and 16. The bottom vessel 18 constitutes a flat bottom circular wall 20 and an upstanding cylindrical side wall 22 of uniform diameter the rim (mouth) 24 of which is rolled to provide a finished appearance and to conceal sharp edges, this being conventional. Thus, in effect, the bottom vessel has the standard shape of a simple pot.

The upper vessels of the stack, to wit, the vessels 12, 14 and 16, i.e. all the vessels except the bottom vessel 18, likewise include a cylindrical flat bottom 26. However, the bottom 26 is small enough to be telescopically (nestably) received within the mouth, i.e. the cylindrical side wall, of the vessel beneath it. Extending upwardly from the periphery of the flat bottom wall 26 of each upper vessel is a cylindrical flange 28. Said flange terminates at an outwardly extending circumferential rib 30. The diameter of the base of the rib is approximately equal to the internal diameter of the cylindrical side wall 32 of the next lowermost vessel but the apex (peak) of the rib has a diameter in excess of this interior surface. Accordingly, the rib 30 effectively provides an annular circumferential protuberant shoulder which is adapted to be seated upon the mouth (rim) of the next lowermost vessel, while there is received in said mouth the flange 28 and the flat bottom 26. Said flange 28 which is telescopically received in the next lowermost vessel detachably couples each vertically adjacent pair of vessels and nicely (snugly) seats the upper vessel in the lower vessel so that there is no appreciable relative shifting of the two vessels in a lateral direction. Extending upwardly from the rib 30 is a cylindrical side wall 32 that terminates in a rolled upper edge 34. The inner diameter of the wall 32 is slightly larger than the outer diameter of the flange 28. It will be apparent that successive ones of said upper vessels 12, 14 and 16 thus can be stacked upon one another in semi-telescopic relationship, the telescoping action being limited by abutment of the rib 30 against the mouth of the next lower vessel.

As noted above, a preferred material for fabrication of the vessels is sheet aluminum but I wish it to be clearly understood that any suitable alternate material can be employed. By way of example such alternate materials include cast aluminum, steel, stainless steel, copper, aluminum clad stainless steel, copper clad stainless steel, copper clad aluminum, ceramic coated metal, porcelain coated metal, heat resistant ceramic, clay and heat resistant glass.

It further will be appreciated that the vessels may be made in any desired color. For instance, the porcelain and ceramic coated vessels can have imparted thereto any hue or design whatsoever. The aluminum vessels can be anodized in many different colors. It also will be obvious that any desired finish can be imparted to the vessels, e.g. specular, matte, hammered or brushed.

The vessels may be further modified to provide special functions. The vessels as thus far described simply are containers in which can be placed various foods or liquids either hot or cold. By altering the physical construction of the vessels, but retaining the tubular side walls and the annular shoulders, as well as the telescoping bottom portions, various special functions can be imparted. For instance, one or more of the vessels can be equipped with a holder for a smaller heating can, e.g. a can containing alcohol in a solid petroleum product (for example a mineral grease). Such a vessel can additionally be provided, if thought desirable, with vents, a cap and sundry other openings. Still further, one or more of the individual vessels may include parallel inner and outer tubular walls with an annular vacuum space therebetween whereby to better enable it to preserve heat or cold in foods. In this event, the telescopic bottom portion of the next upper vessel will be of a further reduced diameter to permit reception in the smaller interior of the insulated vessel. One or more cans can be provided with a spigot or spout to facilitate pouring. One or more cans may be provided with an erect central internal tubular element having lateral openings adjacent its bottom so that the can can be used as a still or as a percolator. The foregoing modifications are simply exemplificative and are not to be construed as a limitation of my invention.

Pursuant to my invention, each of the vessels that is used is permanently provided with a pair of bail type individual fixed manipulating handles 36. Each said fixed handle essentially is in the shape of a U constituting two arms that extend away from the associated cylindrical side wall of the vessel and are connected at their outer extremities by a head, the arms and head between them defining an open space adjacent the outer side of the vessel. Each fixed handle 36 is suitably connected to the vessel, as by welding, brazing or riveting. The handles can be made of sheet metal, as shown, or of heavy gauge wire, or of any other suitable material. The pair of fixed handles for each vessel are located on diametrically opposite sides of the vessel.

The uppermost vessel is detachably closed by a cover 38 having a head 40 preferably approximating the shape of a knob. Desirably, the top of the cover (knob) is substantially flat. The circular indentation 42 which is illustrated is simply included for design purposes. The neck 44 of the cover defines an internal cylindrical recess 46 which, when the cover is inverted in a manner soon to be described, forms a receptacle. Said receptacle is adapted to have disposed therein a heating can 48. This can is of a standard type containing a solid fuel such for instance as alcohol in a solid petroleum grease, e.g. a "sterno" can. Preferably the receptacle is of such dimensions that the metal can 48 is a sliding frictional fit therein. Thereby when the cover 38 is in place on the top vessel 12 it also serves as a carrier for said can. That is to say, the heating can will be present in the stack of vessels so that it can later be used as a heating medium. The heating can has its open mouth closed by a lid that easily can be removed, e.g. pried off, by the ultimate user.

To make the cover 38 easier to manipulate, to insulate it should the contents of the uppermost vessel be hot, and, principally, to provide greater stability for the cover when inverted and set on a flat surface, the outside diameter of the flat top of the knob 40 desirably is made comparatively large. As shown herein this enlargement of diameter is accomplished by encircling the neck of said knob with an annulus 50 of a heat insulating material, e.g. cork or synthetic plastic. The upper surface of the annulus is plane and is disposed at the level of the flat upper surface of the knob so that they jointly provide a broad plane surface which is designed to rest upon a flat horizontal supporting surface when the cover 38 is removed from the stack of vessels, turned upsidedown and placed on such supporting surface to act as a stand for the heating can.

For a reason which later will be apparent the interior of the cover 38 is formed with an annular groove 52. Desirably this groove is located at a comparatively wide diameter of the cover, for instance, near the open mouth thereof.

Over and above the individual bail type fixed handles 36 I have described, I provide a common compression-coupling and carrying handle 54. The principal functions of said common handle are (1) to firmly secure all the cans in the stack to one another (compression-couple the same) so they will not come apart or rattle, (2) to enable the stack to be transported and handled as a single unit (bundle) to wit, to provide a carrying arrangement which can be conveniently engaged by a user's hand, that is to say, grasped by curling the fingers about an elongated carrying member that will be in horizontal position when the stack is disposed in its normal vertical position, (3) to selectively engage the inverted cover and one or more of the vessels in such a manner that the vessels function as a chafing dish, (4) to selectively engage two or more vessels in a fashion such that they function as a double boiler and (5) to engage stacks of vessels containing different numbers of vessels or different heights of vessels, that is to say, stacks of varying heights. All of these uses can be obtained with a compression-coupling handle 54 constructed in the manner shown.

Said common handle (not to be confused with the individual bail type fixed handles 36) is shown in FIG. 1 as it appears when in compression-coupling condition, in FIG. 2 as it appears during the process of being uncoupled from a stack of vessels, in FIG. 3 as it appears with its parts exploded, in FIG. 6 as it appears when used with an arrangement of vessels that serves as a chafing dish, in FIG. 7 as it appears when used with an arrangement of vessels that serves as a chafing dish and with the handle altered to provide a stabilizing auxiliary support, and in FIG. 8 as it appears when used with an arrangement of vessels that serves as a double boiler and with the handle altered to provide a stabilizing auxiliary support.

The handle 54 includes a carrying member 56 which constitutes an elongated strip of self-form-maintaining material that is adapted to have the fingers of a hand curled about the same for the purpose of gripping and carrying a stack of vessels. Depending from opposite ends of the carrying member 56 are a pair of parallel flanges 58, 60 the purpose of which is to provide enough space below the carrying member to prevent the knuckles of a person's hand from being skinned or bruised on the knob 40 or the annulus 50 or on a compression-coupling member which soon will be described. In other words, the flanges 58, 60 are designed to maintain the carrying member 56 in elevated position away from the stack of vessels when the handle 54 is in compression-coupling position.

The lower ends of the flanges 58, 60 are in one piece with downwardly and outwardly sloping reaches 62, 64 that are integral with a first (outer) pair of parallel vertical legs 66, 68. The function of the reaches 62, 64 is to space the first (outer) pair of legs 66, 68 apart from one another a distance in excess of the width of the vessels 12, 14, 16 and 18 (inclusive of the individual fixed handles 36). It is convenient to make the length of the carrying member 56 less than the width of the vessels or specifically about equal to the width of a person's fist so that when said member is grasped by a hand the hand will be automatically approximately centered with respect to the center of gravity of the compression-coupled stack of vessels. However the width of a fist is usually less than the diameter of the vessels. This difference in size is taken up by the sloped reaches 62, 64.

The first (outer) pair of legs 66, 68 is slidably coupled to a second (inner) pair of parallel vertical legs 70, 72 which latter when the handle is used for compression-coupling are aligned, juxtaposed with and inside of the first pair of legs 70, 72. The inner pair of legs 70, 72 are parallel to one another and their lower ends terminate in retroverted bends 74, 76 located internally of these legs. Said bends connect the inner legs 70, 72 to internal upwardly extending posts 78, 80. The posts 78, 80 are registered with the inner legs 70, 72 and are parallel to one another and to said legs. The lengths of the posts 78, 80 which are equal to one another are approximately equal to the lengths of the inner legs 70, 72 and the lengths of the inner legs 70, 72 are approximately equal to the lengths of the outer legs 66, 68.

Pursuant to a feature of my invention each of the inner legs 70, 72 is formed, preferably adjacent the retroverted bends 74, 76 with an outwardly extending tongue or tab 82.

The outer legs 66, 68 are extensibly interengaged with the inner legs 70, 72 so that both pairs of said legs together with the elements associated therewith jointly constitute the common compression-coupling and carrying handle 54. Such interengagement is effected in any suitable manner which will permit controlled relative movement of the two pairs of legs. Desirably this is done by a bolt and slot connection. More particularly, each inner leg 70, 72 has mounted thereon adjacent the upper end of the outwardly facing surface thereof a bolt 84 the head of which is rigidly connected to the leg and the threaded shank of which projects outwardly away from the leg at right angles thereto. This threaded shank is slidably received in an elongated slot 86 running lengthwise of the associated outer leg. Each slot 86 extends over almost the full length of the outer leg in which it is provided. Each bolt 84 has threadedly received on its tip a nut, e.g. wing nut 88, so that when the bolts are tightened the two pairs of inner and outer legs will be firmly locked to one another in some selected relative position thereof, and when the bolts are loosened the legs can be moved with respect to one another in a manner soon to be described.

One of the desired relative movements of the inner and outer legs is lengthwise to enable the overall length of the compression-coupling handle 54 to be increased or decreased at will so as to accommodate stacks of different heights. It will be appreciated that although the above described interengagement, i.e. between the bolts 84 and slots 86, will suffice to permit such lengthwise contraction or expansion to take place, it is preferable to include further means to maintain the outer legs 66, 68 in parallelism with the inner legs 70, 72 during relative longitudinal movement. To this end, i.e. to maintain parallelism, I provide adjacent the bottom of each of the outer legs 66, 68 on the inwardly facing surface thereof a headed pin 90 slidable in a slot 92 running lengthwise of the associated inner leg 70, 72. The slots 92 are about as long as the slots 86. Thereby as the lengths of the two pairs of legs are shortened or lengthened the desired parallel relationship will be maintained.

It later will be pointed out that under certain circumstances it is helpful to disturb the aforesaid parallel relationship or, in other words, to rotate one leg with respect to another. Such additional degree of freedom of movement is provided for in the construction of my handle 54 by including a short inclined slot 94 that connects the top end of each long slot 92 with a vertical, i.e. longitudinal, side edge of the leg in which the long slot is formed. Said short inclined slot is wide enough to accommodate the shank of the headed pin 90, whereby when the pin is raised to the top of the long slot 92 it can be disengaged from the long slot by movement through the short inclined slot 94. It will be understood that such movement only can be effected when the wing nuts 88 are loose. The outer end of the slot 94 is spanned by a depressed bridge 95 in order to maintain strength and rigidity in the legs 70, 72 and still permit the head of the pin 90 to clear said slot.

In the two parts carrying handle 54 as thus far described when the nuts 88 are tight each joined pair of inner and outer legs at each side of the stack acts, in effect, as a single leg connecting one of the sloped reaches to an associated retroverted bend and post. With the parts of the handle 54 so interengaged the posts 78, 80 are spaced apart a proper distance to be received between the individual fixed handles 36 of any vessel.

It should be mentioned at this point that regardless of diversity of shape, size, construction, material and function of the different vessels in a stack 10, all of said vessels must have in common a certain set of dimensions, to wit, all of the individual fixed handles 36 must be identically spaced away from the longitudinal center line of the stack and, moreover, the external configurations and dimensions of all the vessels must be such that there are no external protuberances in excess of the radial spacing of the individual fixed handles. Phrased differently, the radii of all portions of all the surfaces of all the vessels is less than the radial distance from the heads of the U-shaped individual fixed handles to the longitudinal center line of the stack. Thus, regardless of the orientation of the vessels in the stack, the individual fixed handles 36 always are clear and can be approached from their lower sides, that is to say, an element can be vertically inserted into any such individual handle from its lower side because the space therebeneath is not blocked (is clear).

The distance between the posts 78, 80 is slightly less than the diametrical distance between the heads (closed ends) of any, and therefore each, pair of individual fixed handles. Moreover the width and thicknesses of the posts 78, 80 are less, respectively, than the space between the two legs of each bail shaped individual fixed handle and the adjacent side wall of the vessel. Thereby each post 78, 80 can be easily slipped vertically into any one of the bail type individual fixed handles. Preferably the fit between the post and the bail type individual fixed handle does not provide too much clearance circumferentially of the vessel. However this is neither critical nor important All the parts of the compression-coupling and carrying handle can be made of any suitable material, however metal is preferred and preferably it is a metal that will match or harmonize with the materials used for the vessels. The metal chosen and the thickness employed should be such that the metal can be resiliently bent with ease by hand, i.e. so that the legs and posts can be flexed without lossing their shape permanently. For this reason and for economic reasons, I prefer to make each part of the handle 54 from a single strip of sheet metal configured to the shape hereinabove described.

The common handle 54 further includes a compression-coupling member 96 in the form of a U-shaped swinging element including a base 98 and a pair of end legs 100, 102. The tips of the legs are rotatably secured in axial alignment, as by rivets 104, to the flanges 58, 60. Said compression-coupling member being located between these flanges. For any given stack of vessels the distance between the rivets 104 and the base 98 of the compression-coupling member and the overall effective length of the interengaged inner and outer pairs of legs are such that when the compression-coupling member is swung so that its base 98 is 180° away from the carrying member 56, said base 98 will press firmly against the cap 38 on the uppermost vessel 12 of the stack while the individual fixed handles 36 of the lowermost vessel 18 of the stack are pressed against the retroverted bends 74, 76. It will be appreciated therefore, that for any specific height of stack the overall length of the two pairs of interengaged inner and outer legs should be adjusted by the user and then set by tightening the wing nuts 88.

Assuming that said pairs of legs have been relatively adjusted to the proper lengths, I assemble a stack so that the same may be carried about by first threading the tips of the posts 78, 80 through the openings provided in the individual fixed handles 36 of the lowermost vessel 18. It may be pointed out that sufficient clearance is provided between the upper ends of the posts 78, 80 and the sloping reaches 62, 64 to permit the foregoing action to take place. Thereafter I manipulate the next vessel 16 so as to thread its individual fixed handles 36 down over the posts 78, 80. In FIG. 2 I have shown said vessel 16 in phantom, being reversely moved to slip it off rather than over the upper ends of the posts 78, 80, this being the operation employed when it is desired to uncouple the vessels of the stack from the carrying handle. Now the third and fourth and further vessels, if used, are slipped over the posts 78.

Finally, the compression-coupling member 96 is swung down, i.e. so that its base 98 is lowermost. If the inner and outer engaged pairs of legs are of the right length this action will press the base 98 against the knob 40 of the cover 38 and at the same time press the entire stack of vessels downwardly so as to compress the stack between said base 98 and the retroverted bends 74, 76. If in this locked position of the compression-coupling member 96, the proper degree of compression is not secured because the inner and outer engaged pairs of legs have too great a combined length such combined length is shortened by loosening the wing nuts 88, contracting the pairs of legs and then retightening the wing nuts.

The stack of vessels is decompressed and disassembled by practicing the foregoing steps in the reverse order.

As noted heretofore with the construction of the vessels and carrying handle that has been described I am able to rearrange the same for use as a chafing dish. This rearrangement is illustrated in FIG. 6. To effect such arrangement I first slide all of the vessels except a single one, preferably the bottom vessel 18, off the posts 78, 80. Then I elevate this remaining vessel toward the upper ends of the posts so as to leave the bottom ends clear; thereupon by the use of manual pressure I flex the two retroverted bends 74, 76 toward one another and while maintaining this flexed condition insert these bends within the cover 38. Desirably, although not necessarily, the cover is at this time inverted. After said retroverted bends have been located within the open side of the cover, the bends are released. Optionally before such release or after, if desired, the tongues 82 are aligned with the annular groove 52 so that said tongues are aligned to spring into this annular groove which acts to lock the carrying handle to the inverted cover with the lower ends of the handle bowed toward one another and with the vertical portions of the handle under stress. The combined handle and cover now may be set upon a flat surface as shown in FIG. 6. The lowermost vessel, the individual handles of which are threaded onto the now bowed posts 78, 80 will be retained in position since it cannot slip down the converging posts and moreover since the posts are bowed they will frictionally embrace the lowermost vessel. Said vessel is filled with water or some other liquid. If it is desired to heat the latter the lid of the heating can 48 is pried off and the fuel therein ignited. Another vessel, e.g., the vessel 16, is seated on the lowermost vessel 18 and it will be heated by the heat of the vapor boiling up from the liquid contained in the vessel 18 so that the arrangement shown will act as a chafing dish or a double boiler.

It will be observed that in the aforesaid arrangement stability is excellent because of the broad supporting surface provided by the annulus 50. Nevertheless, if it is desired to additionally stabilize such arrangement the same readily may be accomplished as shown in FIG. 7. This is done by loosening the wing nuts 88, extending the two pairs of legs to fully expanded position and slipping the headed pins 90 through the lateral grooves 94. Then the outer pair of legs 66, 68 are swung downwardly until they engage the supporting surface as shown in FIG. 7. Now the wing nuts 88 are retightened to preserve the relative arrangement thus secured. I may mention that it is preferred to extend the two pairs of legs and to disengage the headed pin 90 from the slots 92 prior to flexing the retroverted bends 74, 76 inwardly toward one another inasmuch as difficulty otherwise may be encountered in moving the heads of the pins 90 past the individual handles 36 of the lowermost vessel caught between the flexed posts.

In FIG. 8 I have shown still another arangement which enables me to use the carrying handle and vessels as a double boiler. Such arrangement is equivalent to that shown in FIG. 7 in that it disposes the vessels so that one of them is elevated and is designed to be heated. Nevertheless, the second arrangement, although it has certain advantages over the first, is not as attractive because the liquid containing vessel which is to be heated is not gracefully suspended in spaced elevated position above the heater as in a chafing dish. The advantages of the second arrangement are its greater stability and the ability to use one of the vessels for containing the heater rather than the cover which therefore does not have to be specially shaped to frictionally engage the heating can.

In the arrangement of FIG. 8 the posts 78, 80 are threaded through the individual handles 36 of two vessels, e.g., the lowermost vessel 18 and another vessel 16. However, the vessels are not stacked in vertical alignment; rather the upper vessel is offset relative to the lower vessel as clearly indicated in FIG. 8 so that the posts are inclined with respect to the horizontal. To stabilize the posts in this position the first pair of legs 66, 68, after having been extended, are angularly swung to the supporting position shown in FIG. 8 and tightened by the nuts 88. A heating can 106 is placed in the bottom vessel 18 and lit. Water or some other liquid to be heated is placed in the vessel 16. If the arrangement is to be used for a double boiler another vessel, e.g., the vessel 14, is placed on the top of the vessel 16.

It will thus be seen that I have provided a device which achieves the several objects of this invention and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letter Patent:

1. In combination, a stack of vessels, at least each of the vessels above the bottom vessel having a lower portion of reduced diameter which is telescopically received in the mouth of the vessel beneath it, at least the bottom vessel including a pair of diametrically opposed individual fixed bail-type handles protruding from the side walls thereof, a compression-coupling carrying handle, said last named handle comprising a carrying member, a pair of legs pendent from the carrying member and terminating in a pair of upwardly extending posts, a pair of outwardly extending members at the bottom ends of the legs, at least one vessel above the bottom vessel having outwardly extending opposed bail-type handles, said legs and posts being resiliently flexible, a cover on the uppermost vessel, said cover having an internal groove dimensioned and shaped to receive the outwardly extending members on the handle, said handle further including a compression-coupling member pivoted to the handle and adapted to be swung against the cover to compress the stack of vessels between the compression member and the lower ends of the legs, the interior of said cover being shaped to receive a heating means, whereby upon removal of the cover the lower ends of the legs can be flexed toward one another to introduce the outwardly extending members into the groove in the cover when the latter is inverted and the bottom vessel can have its handles threaded over the posts to enable the contents thereof to be heated by a heating member disposed in the cover while the bottom vessel is maintained elevated above the cover.

2. In combination, a stack of vessels, at least each of the vessels above the bottom vessel having a lower portion of reduced diameter which is telescopically received in the mouth of the vessel beneath it, at least the bottom vessel including a pair of diametrically opposed individual fixed bail-type handles protruding from the side walls thereof, a compression-coupling carrying handles, said last named handle comprising a carrying member, a pair of legs pendent from the carrying member and terminating in a pair of upwardly extending posts, a pair of outwardly extending members at the bottom ends of the legs, said legs and posts being resiliently flexible, a cover on the uppermost vessel, said cover having an internal groove dimensioned and shaped to receive the outwardly extending members on the handle, said handle further including a compression-coupling member pivoted to the handle and adapted to be swung against the cover to compress the stack of vessels between the compression member and the lower ends of the legs, the interior of said cover being shaped to receive a heating means, whereby upon removal of the cover the lower ends of the legs can be flexed toward one another to introduce the outwardly extending members into the groove in the cover when the latter is inverted and the bottom vessel can have its handles threaded over the posts to enable the contents thereof to be heated by a heating member disposed in the cover while the bottom vessel is maintained elevated above the cover.

3. In combination, a stack of vessels, at least each of the vessels above the bottom vessel having a lower portion of reduced diameter which is telescopically received in the mouth of the vessel beneath it, at least the bottom vessel including a pair of diametrically opposed individual fixed bail-type handles protruding from the side walls thereof, a compression-coupling carrying handle, said last named handle comprising a carrying member, a pair of legs pendent from the carrying member and terminating in a pair of upwardly extending posts, a pair of outwardly extending members at the bottom ends of the legs, all of the vessels above the bottom vessel having outwardly extending opposed bail-type handles, said legs and posts being resiliently flexible, a cover on the uppermost vessel, said cover having an internal groove dimensioned and shaped to receive the outwardly extending members on the handle, said handle further including a compression-coupling member pivoted to the handle and adapted to be swung against the cover to compress the stack of vessels between the compression member and the lower ends of the legs, the interior of said cover being shaped to receive a heating means, whereby upon removal of the cover the lower ends of the legs can be flexed toward one another to introduce the outwardly extending members into the groove in the cover when the latter is inverted and the bottom vessel can have its handles threaded over the posts to enable the contents thereof to be heated by a heating member disposed in the cover while the bottom vessel is maintained elevated above the cover.

References Cited in the file of this patent

UNITED STATES PATENTS

| | | |
|---|---|---|
| 561,167 | Jennings | June 2, 1896 |
| 695,979 | Widmer | Mar. 25, 1902 |
| 1,065,633 | Stone | June 24, 1913 |
| 1,143,197 | Hubbard | June 15, 1915 |
| 1,436,499 | Hammond | Nov. 21, 1922 |

FOREIGN PATENTS

| | | |
|---|---|---|
| 626 | Italy | of 1877 |
| 642,619 | France | May 6, 1928 |